United States Patent
Lee

(10) Patent No.: US 12,483,058 B2
(45) Date of Patent: *Nov. 25, 2025

(54) BATTERY PACK

(71) Applicant: SAMSUNG SDI CO., LTD., Yongin-si (KR)

(72) Inventor: Chulseung Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,192

(22) Filed: May 16, 2024

(65) Prior Publication Data

US 2024/0305124 A1 Sep. 12, 2024

Related U.S. Application Data

(63) Continuation of application No. 16/966,971, filed as application No. PCT/KR2019/000652 on Jan. 16, 2019, now Pat. No. 11,996,726.

(30) Foreign Application Priority Data

Feb. 5, 2018 (KR) ........................ 10-2018-0014173

(51) Int. Cl.
*H02J 7/00* (2006.01)
*H01M 10/48* (2006.01)
*H01M 50/583* (2021.01)

(52) U.S. Cl.
CPC ....... *H02J 7/007182* (2020.01); *H01M 10/48* (2013.01); *H01M 10/482* (2013.01); *H01M 50/583* (2021.01); *H02J 7/00302* (2020.01); *H01M 2200/103* (2013.01)

(58) Field of Classification Search
None
See application file for complete search history.

(56) References Cited

U.S. PATENT DOCUMENTS

| | | | |
|---|---|---|---|
| 6,046,575 | A | 4/2000 | Demuro |
| 8,618,805 | B2 | 12/2013 | Li |
| 8,854,007 | B2 | 10/2014 | Kim et al. |
| 8,953,293 | B2 | 2/2015 | Ji |

(Continued)

FOREIGN PATENT DOCUMENTS

| | | | |
|---|---|---|---|
| CN | 1295731 A | 5/2001 |
| CN | 102163838 A | 8/2011 |

(Continued)

OTHER PUBLICATIONS

International and Korean Search Report dated Apr. 24, 2019 for PCT/KR2019/000652.

(Continued)

*Primary Examiner* — Arun C Williams
(74) *Attorney, Agent, or Firm* — Lee IP Law, P.C.

(57) ABSTRACT

A battery pack is disclosed. According to an embodiment of the present disclosure, a battery pack includes: a plurality of battery cells connected in series to each other; a fuse connected between two of the plurality of battery cells; and a primary protective circuit configured to measure voltages of the plurality of battery cells and control a protective operation of the fuse according to a highest voltage of the measured voltages.

8 Claims, 3 Drawing Sheets

(56) References Cited

U.S. PATENT DOCUMENTS

| | | | |
|---|---|---|---|
| 8,981,725 B2 | 3/2015 | Kim | |
| 9,081,069 B2 | 7/2015 | Shibata | |
| 9,222,985 B2 | 12/2015 | Kang et al. | |
| 9,331,325 B2 | 5/2016 | Lim | |
| 9,341,678 B2 | 5/2016 | Kim et al. | |
| 9,761,911 B2 | 9/2017 | Lee et al. | |
| 2002/0039270 A1* | 4/2002 | Sato | H02H 9/042 361/58 |
| 2005/0242779 A1 | 11/2005 | Yoshio | |
| 2008/0106234 A1 | 5/2008 | Yun | |
| 2010/0127663 A1 | 5/2010 | Furukawa et al. | |
| 2011/0003182 A1 | 1/2011 | Zhu | |
| 2011/0228436 A1 | 9/2011 | Lee et al. | |
| 2011/0291481 A1 | 12/2011 | Matsumoto et al. | |
| 2015/0236535 A1 | 8/2015 | Suzuki et al. | |
| 2015/0263391 A1 | 9/2015 | Choi | |
| 2016/0094059 A1 | 3/2016 | Maetani | |

FOREIGN PATENT DOCUMENTS

| | | | |
|---|---|---|---|
| CN | 103378375 A | 10/2013 | |
| CN | 105471018 A | 4/2016 | |
| JP | 2002-095157 A | 3/2002 | |
| JP | 2011-028854 A | 2/2011 | |
| JP | 2014-149161 A | 8/2014 | |
| JP | 2015-165735 A | 9/2015 | |
| KR | 10-2011-0076119 A | 7/2011 | |
| KR | 10-2012-0059852 A | 6/2012 | |
| KR | 10-2012-0075398 A | 7/2012 | |
| KR | 10-2012-0128552 A | 11/2012 | |
| KR | 10-2013-0075640 A | 7/2013 | |
| KR | 10-2014-0072489 A | 6/2014 | |
| KR | 10-2015-0053662 A | 5/2015 | |
| KR | 10-2017-0022161 A | 3/2017 | |
| KR | 10-2017-0053886 A | 5/2017 | |
| TW | 201136082 A1 | 10/2011 | |

OTHER PUBLICATIONS

European Search Report dated Sep. 17, 2021.
Chinese Office action and Search Report dated Jan. 11, 2023.
Chinese Office action dated Sep. 13, 2023.
Korean Notice of Allowance dated Nov. 22, 2023.
Chinese Office action dated Jan. 24, 2024.

* cited by examiner

BATTERY PACK

CROSS REFERENCE TO RELATED APPLICATIONS

This is a continuation application based on pending application Ser. No. 16/966,971, filed Aug. 3, 2020, the entire contents of which is hereby incorporated by reference.

Application Ser. No. 16/966,971 is the U.S. national phase application based on PCT Application No. PCT/KR2019/000652, filed Jan. 16, 2019, which is based on Korean Patent Application No. 10-2018-0014173, filed Feb. 5, 2018, the entire contents of all being hereby incorporated by reference.

TECHNICAL FIELD

The present disclosure relates to a battery pack, and more particularly, to a battery pack including a circuit for protecting battery cells in case of overcharge and a short circuit.

BACKGROUND ART

Active research has been conducted into rechargeable secondary batteries along with the development of portable electronic devices such as mobile phones, laptop computers, camcorders, and PDAs. In particular, various types of secondary batteries have been developed, such as nickel-cadmium batteries, lead-acid batteries, nickel-hydrogen batteries, lithium-ion batteries, lithium polymer batteries, metal lithium batteries, and air-zinc batteries.

Such a secondary battery may be provided in the form of a battery pack by manufacturing battery cells and then combining the battery cells with a charge-discharge circuit, and the battery pack is charged or discharged through external terminals of the battery pack which are connected to an external power source or a load.

Battery packs are guaranteed a maximum lifespan when used within a preset voltage and/or capacity range, and to this end, charge and discharge switches are used to control charge and discharge operations according to the voltages of batteries for preventing overcharge or overdischarge of the batteries.

DESCRIPTION OF EMBODIMENTS

Technical Problem

An objective of the present disclosure is to provide a battery pack capable of protecting battery cells in case of overcharge and a short circuit.

Solution to Problem

According to the present disclosure, a battery pack includes: a plurality of battery cells connected in series to each other; a fuse connected between two of the plurality of battery cells; and a primary protective circuit configured to measure voltages of the plurality of battery cells and control a protective operation of the fuse according to a highest voltage of the measured voltages.

Advantageous Effects of Disclosure

The present disclosure may provide a battery pack capable of protecting battery cells in case of overcharge and a short circuit.

BEST MODE

Figure 1:
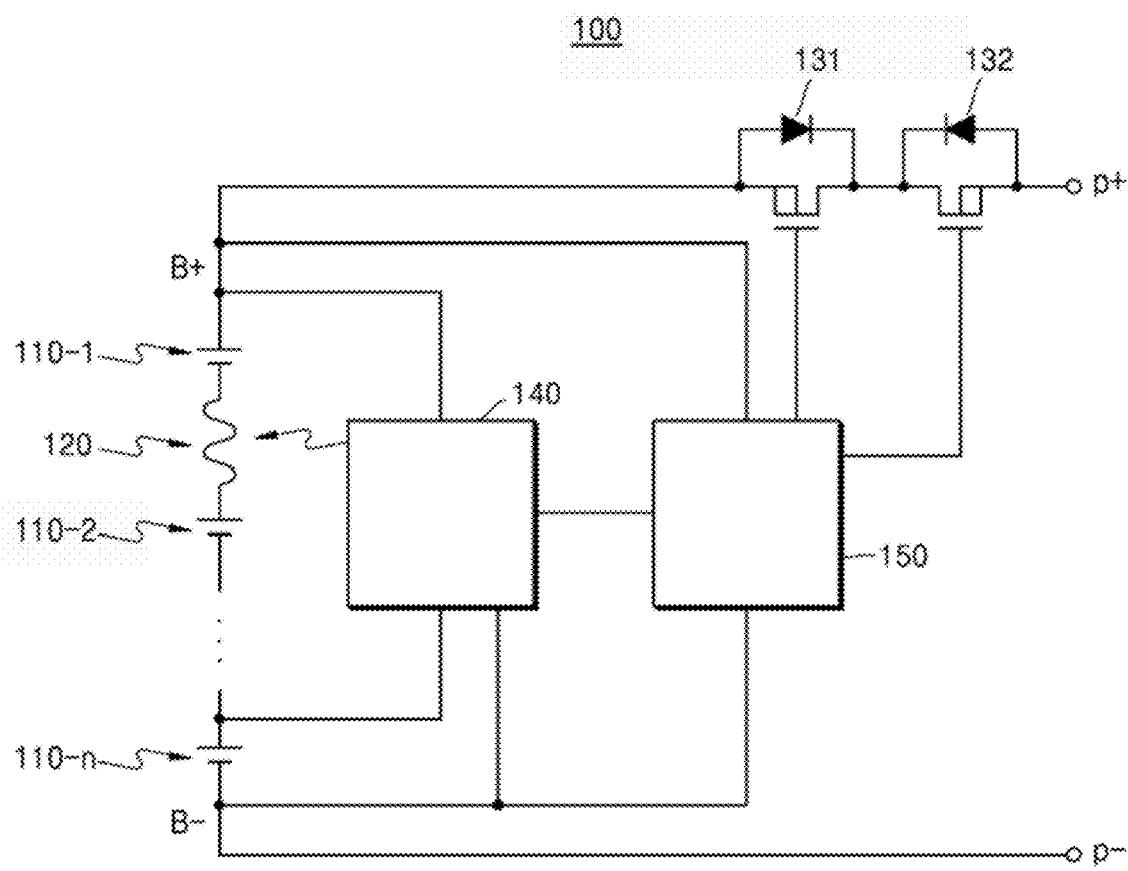
FIG. 1 is a schematic view illustrating a configuration of a battery pack according to an embodiment of the present disclosure.

According to the present disclosure, a battery pack includes: a plurality of battery cells connected in series to each other; a fuse connected between two of the plurality of battery cells; and a primary protective circuit configured to measure voltages of the plurality of battery cells and control a protective operation of the fuse according to a highest voltage of the measured voltages.

In addition, the battery pack may further include: a charge switch and a discharge switch which may be connected to an overall positive (+) or negative (−) terminal of the plurality of battery cells; and a main control unit configured to control switching operations of the charge switch and the discharge switch.

In addition, the main control unit may output a control signal for turning off the charge switch when a charge stop voltage may be detected, and the primary protective circuit may break connection of the fuse when there is an increase in voltage measured after the control signal may be output.

In addition, the primary protective circuit may break connection of the fuse when the highest voltage is equal to or greater than a first cut-off voltage.

In addition, the battery pack may further include a secondary protective circuit connected in parallel to the primary protective circuit and configured to control the protective operation of the fuse.

In addition, the secondary protective circuit may measure the voltages of the plurality of battery cells and may break the connection of the fuse when a highest voltage of the measured voltages is equal to or greater than a second cut-off voltage.

In addition, the second cut-off voltage may be greater than the first cut-off voltage, and the fuse may be connected between a first battery cell and a second battery cell.

MODE OF DISCLOSURE

Hereinafter, example embodiments will be described in detail with reference to the accompanying drawings. However, the present disclosure may be implemented in various other embodiments, and is not limited to the embodiments described herein. These embodiments are provided so that the present disclosure will be thorough and complete, and will fully convey the scope of the present disclosure to those skilled in the art.

In the following description, terms are used only for explaining specific embodiments while not limiting the scope of the present disclosure. The terms of a singular form may include plural forms unless otherwise mentioned. It will be understood that terms such as "comprise," "include," and "have," when used herein, specify the presence of stated features, integers, steps, operations, elements, components, or combinations thereof, but do not preclude the presence or addition of one or more other features, integers, steps, operations, elements, components, or combinations thereof. It will be understood that although the terms "first" and "second" are used herein to describe various elements, these elements should not be limited by these terms. These terms are only used to distinguish one element from other elements.

Hereinafter, example embodiments will be described in detail with reference to the accompanying drawings. In the present disclosure, like reference numerals denote like elements. In the drawings, the same or corresponding elements are denoted with the same reference numeral, and will not be repeatedly described.

FIG. 1 is a schematic view illustrating a configuration of a battery pack 100 according to an embodiment of the present disclosure.

Referring to FIG. 1, according to an embodiment of the present disclosure, the battery pack 100 includes a plurality of battery cells 110-1 to 110-$n$, a fuse 120, and a primary protective circuit 140. The plurality of battery cells 110-1 to 110-$n$ are connected in series to each other, the fuse 120 is connected between two of the plurality of battery cells 110-1 to 110-$n$ to perform a protective operation for the battery pack 100.

The primary protective circuit 140 measures the voltage of each of the plurality of battery cells 110-1 to 110-$n$, and controls the protective operation of the fuse 120 according to the magnitude of the highest voltage of the measured voltages. The primary protective circuit 140 may include a voltage measurement unit and a comparison unit which are connected to each of the plurality of battery cells 110-1 to 110-$n$ to measure the voltages of the plurality of battery cells 110-1 to 110-$n$ and compare the measured voltages.

The primary protective circuit 140 compares the highest voltage of the measured voltages with a preset first cut-off voltage, and when the result shows that the highest voltage is equal to or greater than the first cut-off voltage, the primary protective circuit 140 may break the connection of the fuse 120 by outputting a control signal.

In an embodiment of the present disclosure, the fuse 120 may be connected between a first battery cell 110-1 and a second battery cell 110-2, and when the connection of the fuse 120 is broken, the connection between the first battery cell 110-1 and the second battery cell 110-2 is also broken such that discharge and charge may be stopped.

Therefore, in the battery pack 100 according to an embodiment of the present disclosure, when a cell voltage is equal to or greater than a certain value due to overcharge during a charge operation, the connection of the fuse 120 to the battery cells is broken to prevent problems caused by overcharge.

In addition, according to an embodiment of the present disclosure, as shown in FIG. 1, the battery pack 100 may further include a main control unit (MCU) 150, a charge switch 131, and a discharge switch 132.

The charge switch 131 and the discharge switch 132 may be connected to an overall positive terminal B+ or an overall negative terminal B− of the plurality of battery cells 110-1 to 110-$n$ and the MCU 150 to perform switching operations according to a control signal from the MCU 150. Basically, the charge switch 131 and the discharge switch 132 may control the charge and discharge of the plurality of battery cells 110-1 to 110-$n$ through switching operations, and like the primary protective circuit 140, the MCU 150 may measure the voltages of the plurality of battery cells 110-1 to 110-$n$.

In addition, the MCU 150 may compare the voltages of the plurality of battery cells 110-1 to 110-$n$ with a preset discharge stop voltage and a charge stop voltage, and may control battery charge and discharge operations by using the charge switch 131 and the discharge switch 132.

However, due to a malfunction of the MCU 150 or the charge and discharge switches 131 and 132, charge-discharge control may not be properly performed, and in this case, the primary protective circuit 140 may control the connection of the fuse 120 to prevent problems caused by overcharge.

Therefore, when a battery cell voltage increases to the first cut-off voltage or greater even after the MCU 150 detects a voltage corresponding to the charge stop voltage and outputs a control signal to turn off the charge switch 131, the primary protective circuit 140 may output a signal for breaking the connection of the fuse 120.

Since the primary protective circuit 140 controls the connection of the fuse 120 after the charge stop operation of the MCU 150, it may be understood that the charge stop voltage is lower than the first cut-off voltage.

Figure 2:
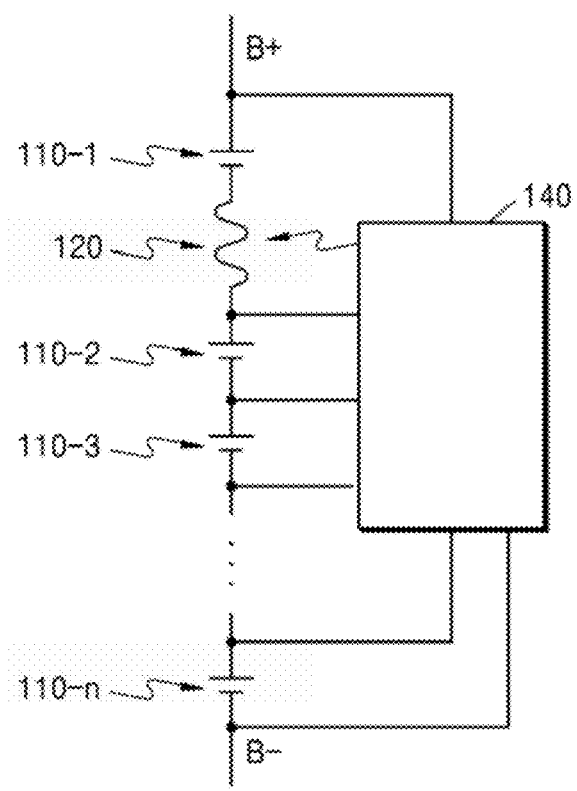
FIG. 2 is a schematic view illustrating a configuration of a protective circuit according to an embodiment of the present disclosure.

FIG. 2 is a schematic view illustrating a configuration of the primary protective circuit 140 according to an embodiment of the present disclosure.

Referring to FIG. 2, according to an embodiment of the present disclosure, the primary protective circuit 140 may be connected to the positive (+) and negative (−) terminals of each of the plurality of battery cells 110-1 to 110-$n$ and may measure the voltage of each of the plurality of battery cells 110-1 to 110-$n$. In addition, the fuse 120 may be connected between two of the plurality of battery cells 110-1 to 110-$n$ and may perform a protective operation for the battery pack.

The primary protective circuit 140 may compare the highest voltage of the measured voltages of the plurality of battery cells 110-1 to 110-$n$ with the first cut-off voltage, and when the first cut-off voltage is lower than the highest voltage, the primary protective circuit 140 may break the connection of the fuse 120 to protect the battery pack.

As described with reference to FIG. 1, the fuse 120 is illustrated in FIG. 2 as being connected between the first battery cell 110-1 and the second battery cell 110-2, but the present disclosure is not limited to this configuration.

In addition, since the plurality of battery cells 110-1 to 110-$n$ and the fuse 120 are connected in series to each other, even when the fuse 120 is connected at any position between the plurality of battery cells 110-1 to 110-$n$, breaking the connection of the fuse 120 leads to breaking the entire connection of the plurality of battery cells 110-1 to 110-$n$, thereby making it possible to perform a sufficient protective operation.

Figure 3:
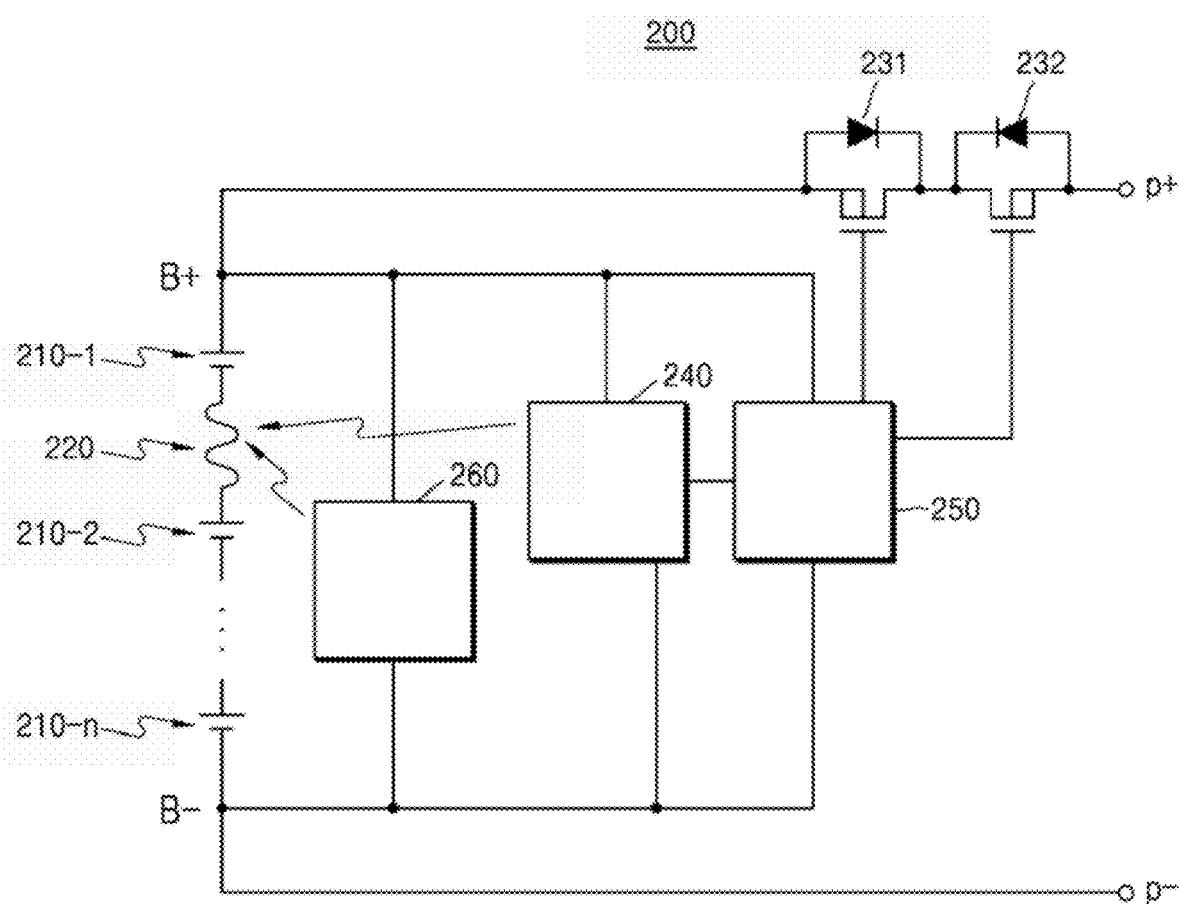
FIG. 3 is a schematic view illustrating a configuration of a battery pack according to another embodiment of the present disclosure.

FIG. 3 is a schematic view illustrating a configuration of a battery pack 200 according to another embodiment of the present disclosure.

Referring to FIG. 3, according to another embodiment of the present disclosure, the battery pack 200 includes a plurality of battery cells 210-1 to 210-$n$, a fuse 220, and a primary protective circuit 240. As described with reference to FIGS. 1 and 2, the plurality of battery cells 210-1 to 210-$n$ are connected in series to each other, and the fuse 220 is connected between two of the plurality of battery cells 210-1 to 210-$n$ to perform a protective operation for the battery pack 200.

In addition, the battery pack 200 further includes a secondary protective circuit 260. The secondary protective circuit 260 is connected in parallel to the primary protective circuit 240, and performs a protective operation for the battery pack 200 like the primary protective circuit 240.

Specifically, the secondary protective circuit 260 measures the voltage of each of the plurality of battery cells

210-1 to 210-*n* and compares the highest voltage of the measured voltages with a second cut-off voltage, and when the highest voltage is equal to or greater than the second cut-off voltage, the secondary protective circuit 260 breaks the connection of the fuse 220.

Even when the primary protective circuit 240 outputs a signal for breaking the connection of the fuse 220, the fuse 220 may not be normally disconnected due to a system error or a device failure, and in this case, the connection of battery cells is not broken, resulting in a continuous increase in battery voltage during a charge operation.

It may be understood that the secondary protective circuit 260 operates in this situation, and thus, the second cut-off voltage may be set to be greater than the first cut-off voltage.

Owing to this configuration, even when a protective operation is not normally performed by the primary protective circuit 240, that is, even when the connection of the fuse 220 is not broken by the primary protective circuit 240, a protective operation for the battery pack 200 may be guaranteed by the secondary protective circuit 260.

The battery pack 200 according to the embodiment shown in FIG. 3 may include an MCU 250, a charge switch 231, and a discharge switch 232. Furthermore, in FIGS. 1 and 3, reference symbols p+ and p− refer to a positive (+) terminal and a negative (−) terminal of the battery pack, respectively.

While some embodiments of the present disclosure have been described herein, it will be understood that various other embodiments may be made within the scope of the present disclosure. In addition, non-described equivalents of the above-described elements may also be within the scope of the present disclosure. Therefore, the scope and spirit of the present disclosure should be defined by the following claims.

INDUSTRIAL APPLICABILITY

The present disclosure may be applied to battery packs which are rechargeable energy sources, and to various devices using battery packs as power sources.

The invention claimed is:

1. A battery pack comprising:
a plurality of battery cells;
a fuse connected between two battery cells of the plurality of battery cells such that breaking a connection of the fuse also breaks a connection between the two battery cells;
a primary protective circuit configured to measure voltages of the plurality of battery cells and control a protective operation of the fuse according to a highest voltage of the measured voltages; and
a secondary protective circuit connected in parallel to the primary protective circuit and configured to control the protective operation of the fuse.

2. The battery pack of claim 1, further comprising:
a charge switch and a discharge switch which are connected to an overall positive (+) or negative (−) terminal of the plurality of battery cells; and
a main control unit configured to control switching operations of the charge switch and the discharge switch.

3. The battery pack of claim 2, wherein the main control unit outputs a control signal for turning off the charge switch when a charge stop voltage is detected, and
the primary protective circuit breaks connection of the fuse when there is an increase in voltage measured after the control signal is output.

4. The battery pack of claim 1, wherein the primary protective circuit breaks connection of the fuse when the highest voltage is equal to or greater than a first cut-off voltage.

5. The battery pack of claim 4, wherein the secondary protective circuit measures the voltages of the plurality of battery cells and breaks the connection of the fuse when a highest voltage of the measured voltages is equal to or greater than a second cut-off voltage.

6. The battery pack of claim 5, wherein the second cut-off voltage is greater than the first cut-off voltage.

7. The battery pack of claim 1, wherein the fuse is connected between a first battery cell and a second battery cell.

8. The battery pack of claim 7, wherein the fuse is connected directly between the first battery cell and the second battery cell such that breaking the connection of the fuse also breaks a connection between the first battery cell and the second battery cell.

* * * * *